United States Patent [19]

Case

[11] 4,455,061
[45] Jun. 19, 1984

[54] MULTI-FACETED HOLOGRAPHIC OPTICAL ELEMENT AND METHODS OF MAKING AND USING SAME

[75] Inventor: Steven K. Case, St. Louis Park, Minn.

[73] Assignee: The Regents of the University of Minnesota, Minneapolis, Minn.

[21] Appl. No.: 174,156

[22] Filed: Jul. 31, 1980

[51] Int. Cl.³ ............................................. G03H 1/22
[52] U.S. Cl. .................................................. 350/3.75
[58] Field of Search .................. 350/3.71, 3.66, 3.73, 350/3.74, 3.72, 3.78, 3.79, 3.75, 3.76

[56] References Cited

U.S. PATENT DOCUMENTS

| | | | |
|---|---|---|---|
| 3,591,252 | 7/1971 | Lu | 350/3.66 |
| 3,619,033 | 11/1971 | McMahon | 350/162 |
| 3,627,400 | 12/1971 | Caufield | 350/3.78 |
| 3,812,496 | 5/1974 | Brooks | 350/3.79 |
| 4,307,929 | 12/1981 | Eveleth | 350/3.71 |
| 4,339,168 | 7/1982 | Haines | 350/3.76 |

OTHER PUBLICATIONS

Levy, U. et al., "Parallel Image Transmission by Unordered Fiber Bundles", Applied Optics, vol. 19, No. 10, May 15, 1980, pp. 1661-1664.

*Primary Examiner*—Bruce Y. Arnold
*Attorney, Agent, or Firm*—Peterson, Palmatier, Sturm, Sjoquist & Baker, Ltd.

[57] ABSTRACT

A holographic optical element is formed by subdividing the surface of a relatively thick dichromated gelatin film into numerous small areas so as to provide a corresponding number of volume facets therebeneath. Each facet is individually exposed with coherent waves, either planar or spherical, so as to record a desired interference pattern within that particular facet. By constructing each facet individually, a volume hologram is created containing an arbitrarily specified complete fringe pattern which will cause a readout beam to be deflected along a desired scan path, or a hologram can be produced which will provide a wavefront transformation when illuminated with an expanded laser beam so as to display a complete image with 100% optical efficiency.

16 Claims, 15 Drawing Figures

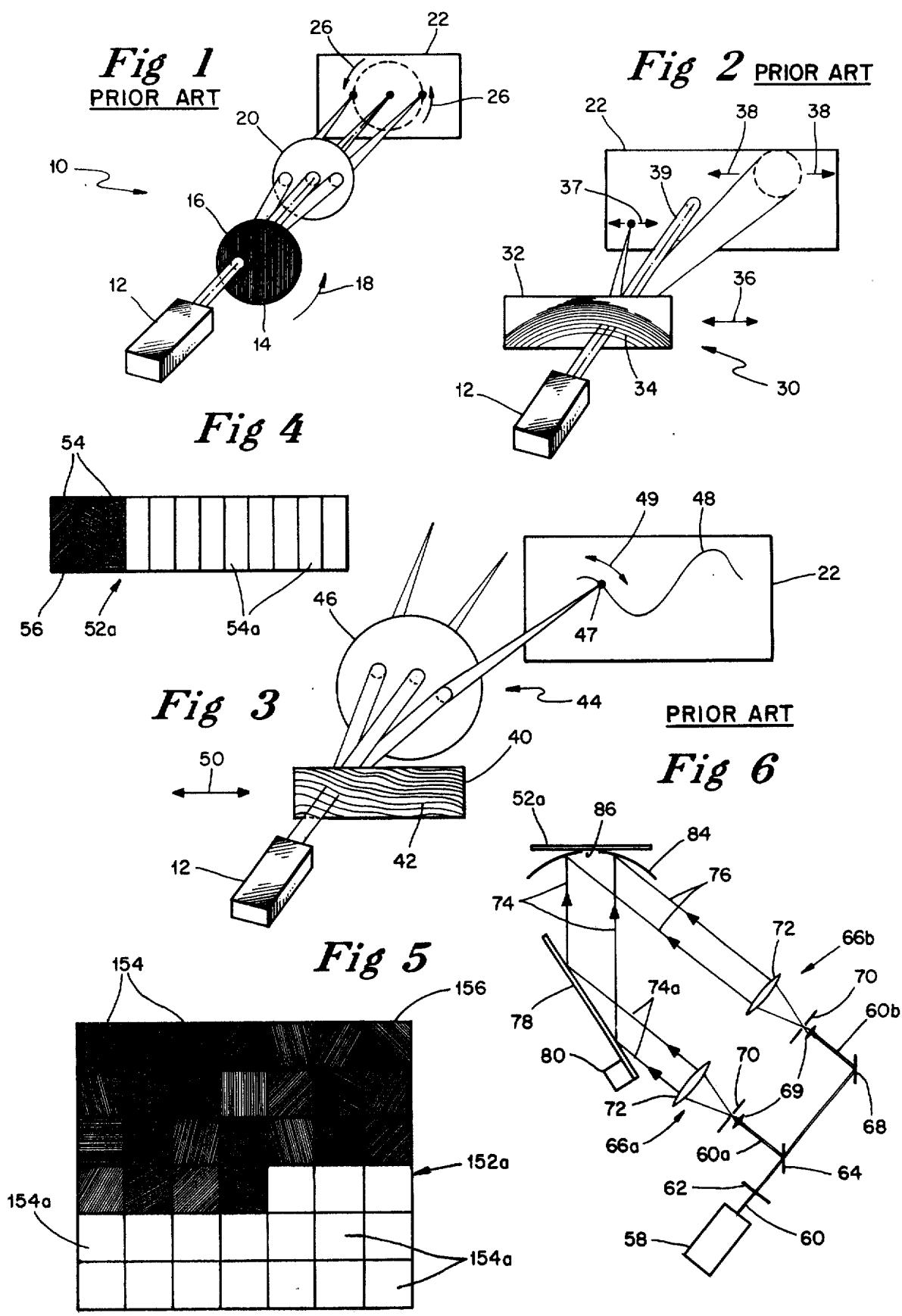

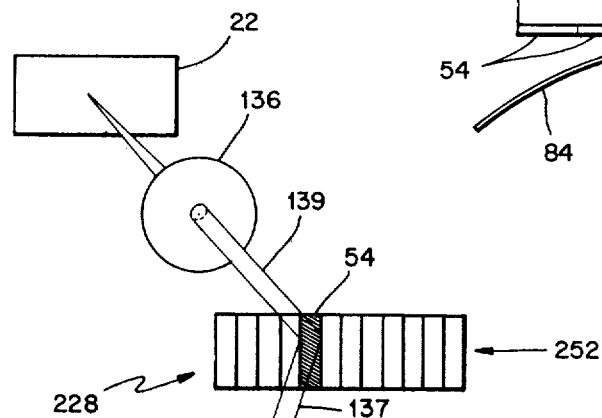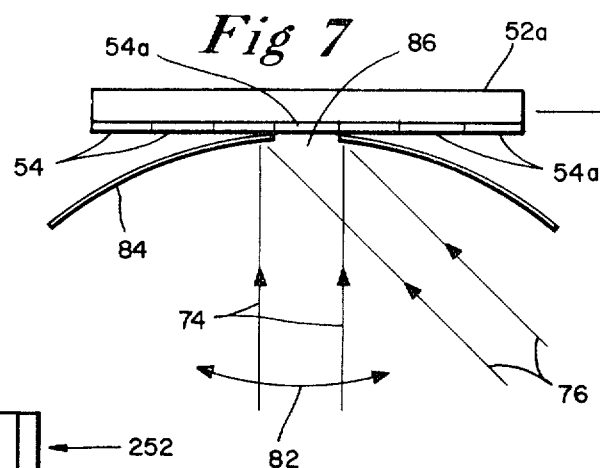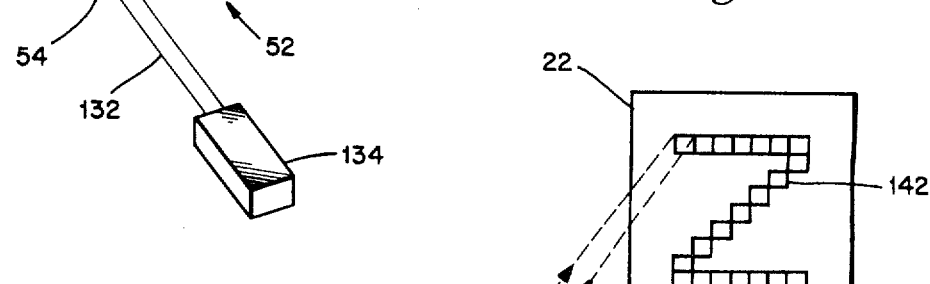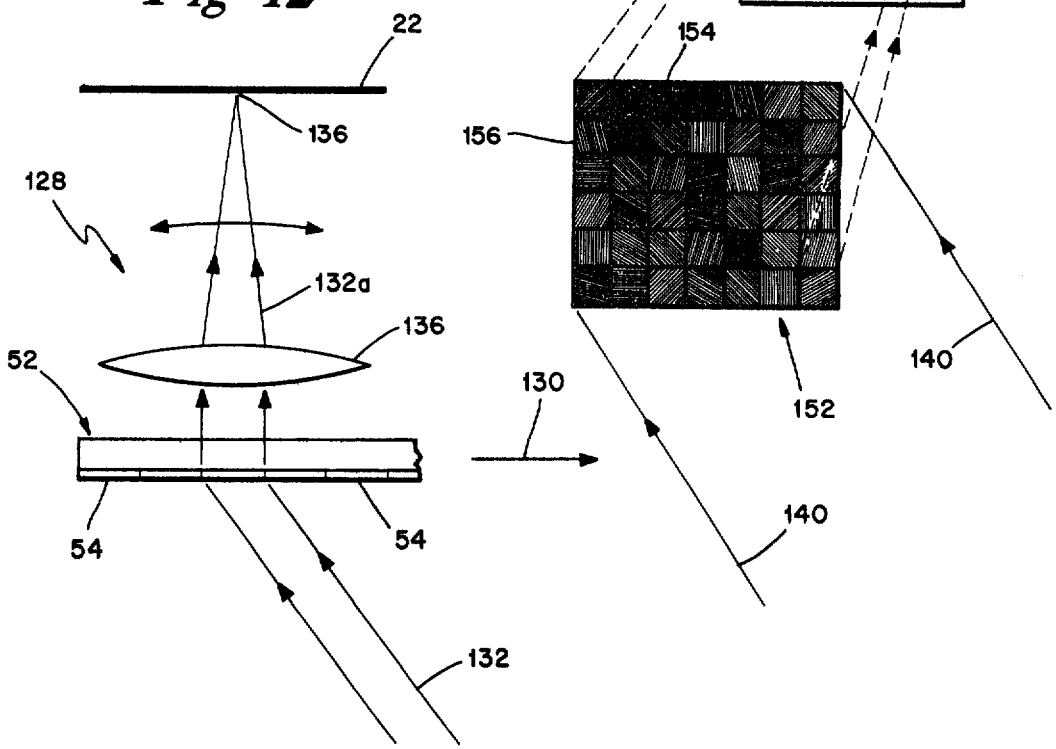

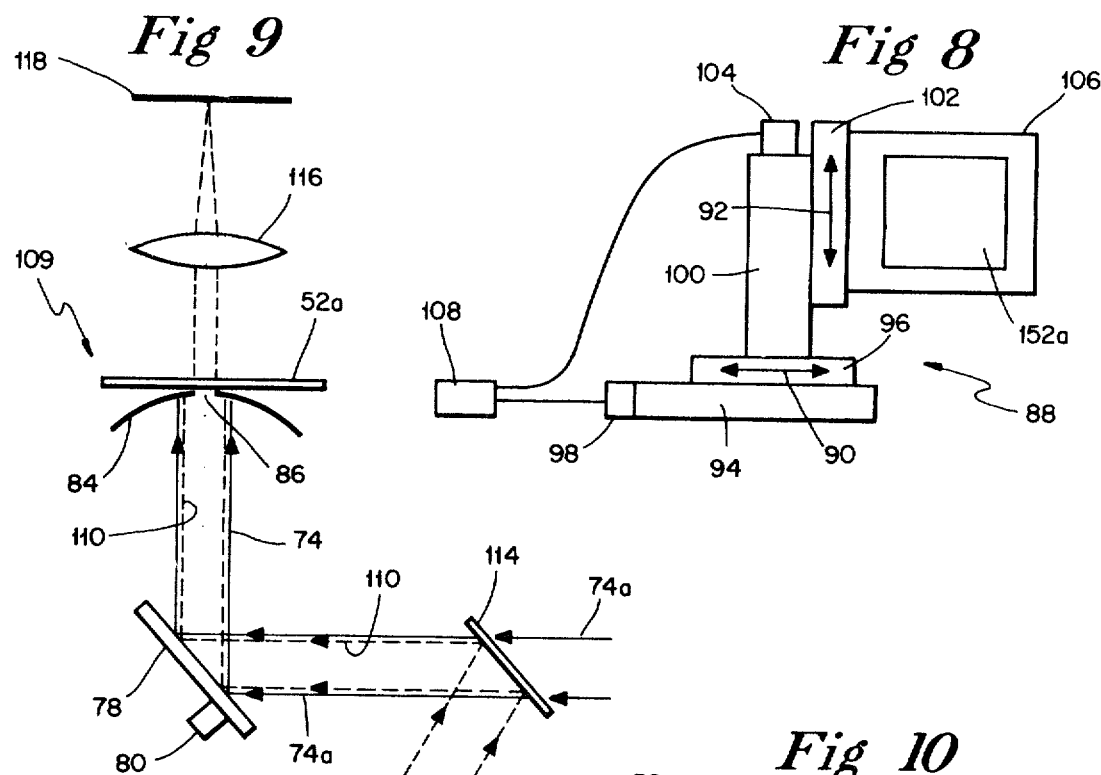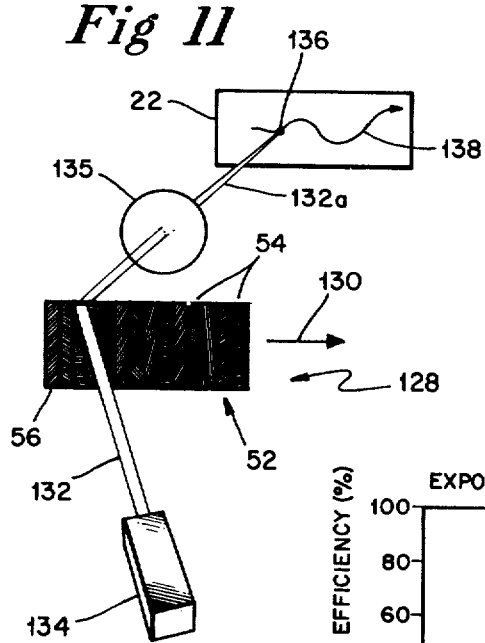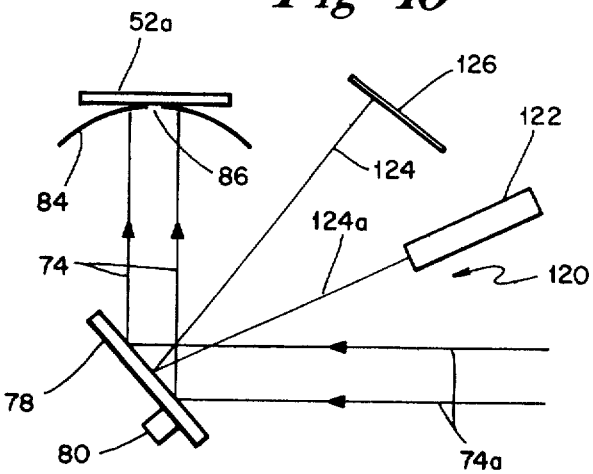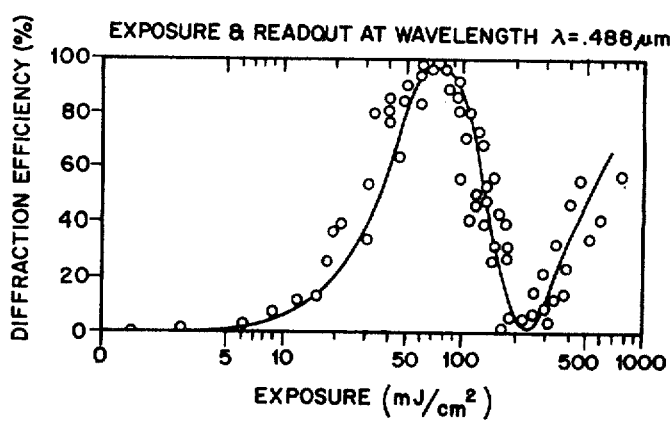

MULTI-FACETED HOLOGRAPHIC OPTICAL ELEMENT AND METHODS OF MAKING AND USING SAME

BACKGROUND OF THE INVENTION

1. Field of the Invention

This invention relates generally to holography, and pertains more particularly to a multi-faceted holographic optical element and method of making and using such an element.

2. Description of the Prior Art

Holographical optical elements must have the correct interference pattern or fringe spacing. In the past such patterns have been recorded by a single exposure on photosensitive film to record the complete pattern, the film then being developed so as to preserve the pattern. As is known, the interference pattern recorded on the film acts like a diffraction grating, or a collection of diffraction gratings, whose orientations and spatial periods are correct for the purpose of diffracting a light wave incident on the film into a desired output pattern, shape or image. The problem has been in constructing holographic optical elements which will have the required set of fringes on the hologram film when the overall interference pattern is complete, and to do so inexpensively.

More recently, computer-generated holograms have been made for the purpose of producing the required set of fringes on the hologram film. This is accomplished by first programming the computer so that it will compute where the fringes ultimately should be. Then artwork is produced from the computed data that contains the desired fringe pattern, this being done with a computer-controlled plotter. Finally, the resulting plot is photoreduced onto a holographic film, the reduction being such that the fringe pattern is sufficiently small to diffract light at whatever appreciable angles are required.

Computer-generated holograms can also be made directly by electron beam writing on a photoresist which is then developed to form the hologram. The advantage of this technique is that the electron beam can write, at the outset, an extremely small pattern. Although no size reduction is needed, the procedure requires very expensive equipment, usually in the million dollar price range. Only a limited number of machines fulfilling this purpose are currently in existence.

Without question, computer-generated holograms are more flexible than other types, but they are often of limited utility because of the high computation costs. Also, whatever plotter inaccuracies exist are carried or continued into the final hologram. The point is that, where the hologram is to contain a relatively large amount of information requiring a large number of fringes to be produced, the involved procedures, even when assisted by a computer, do not provide a satisfactory solution to making an inexpensive hologram. In addition, the maximum possible diffraction efficiency (on the order of only 40.5 percent) is relatively low which is a decided shortcoming. Still further, a computer-controlled hologram produces multiple diffracted orders which limit the working field of a diffractive device such as a scanner. Consequently, while computer-generated holograms do have a high degree of flexibility in producing scan paths, they lack high light efficiency and, when this objection is coupled with the high cost of producing computer-generated holograms, the widespread or general making and use of computer-derived holographic optical elements simply has not as yet evolved.

Where only simple scan patterns are to be produced, it is a relatively easy task to interferometrically construct entire holograms with a single exposure that will produce circular scan patterns and straight line scan patterns. Because the holograms are interferometrically recorded, they can be produced as volume phase holograms which can have 100% diffraction efficiency. These patterns are of such limited utility, however, that even though the holograms are relatively easy to construct, they, for all intents and purposes, have value for only a very restricted class of scanning problems.

SUMMARY OF THE INVENTION

A general object of the present invention is to combine the desirable features of flexibility from computer-generated holograms with the high diffractive efficiency of interferometrically recorded volume phase holograms.

Another object of my invention is to interferometrically construct a holographic optical element that is quite complex when its interference pattern is considered in its entirety so that it could be used to produce an arbitrary, complex scan pattern, yet which is relatively easy to produce in that the overall interference pattern is composed of individually produced simple gratings or zone plates within each of a relatively large number of facets. It is within the purview of the invention to produce holograms in the various facets, which facets are quite small, by interfering only planar and/or spherical waves, which are relatively simple to produce optically.

Another object of my invention is to provide a multi-faceted hologram that will have a very high diffractive efficiency (on the order of 100%) in contrast to the relatively low efficiency of a computer-generated hologram. The highest efficiency holograms (volume, phase type) can only be constructed via interferometric recording. This is because the optical interference pattern must exist through a finite volume of the recording medium or material. However, this three-dimensional recording is not possible with present techniques; for instance, computer-driven plotters which draw an ink pattern would of necessity have to do so on a planar surface, such as a flat piece of paper.

Cognizance should be had of the fact that although the interference pattern required to interferometrically construct an entire scanner hologram may be complex, the required pattern within any given small area or facet on the hologram can be relatively simple, thereby enabling the pattern to be produced by the interference of either or both planar or spherical waves.

Another object is to provide a holographic optical element that will not produce objectionable aberrations when in use. When aberrations are present, diffraction-limited performance is not possible and the hologram output can be appreciably distorted, sometimes to the degree that information is lost during hologram use.

Also, inasmuch as the intensity and shape of the scan spot resulting from the use of a readout beam can be quite critical, the present invention enables the hologram for each facet to be constructed so that the requisite intensity and/or shape of the ultimate scan spot will be of the character needed or desired during a readout operation of the scan variety.

Further, it is an object of the invention to provide the capability of varying the focal power from facet to facet in preparing my holographic optical element when such a feature is desired.

Whereas the physical size of the hologram places a restriction on the overall number of facets that can be utilized in the making of an interference pattern, the invention provides a solution for this shortcoming by enabling the capacity to be increased through the agency of tandem holograms. In this regard, an aim of the invention is to provide a relatively large scan capacity by placing two or more holograms or elements in series with each other. Thus, each hologram can accept input light from a previous stage and will diffract it once more. It should be noted that there is only one strong diffracted order, for all intents and purposes, when volume phase holograms are used with no disturbing additional orders. More specifically, there is but one desired order that contains nearly all of the incident energy so that no drastic energy losses occur during additional or multiple diffractions as long as the Bragg conditions are obeyed.

Still further, as far as tandem configurations are concerned, it is an object of the invention to make use of serially-disposed multi-faceted elements for the purpose of correcting for aberrations. An example would be the correction of wavelength dependent dispersion, present whenever broadband illumination is used. This dispersion can be corrected with the use of two serially placed (tandem) gratings.

Still another object is to make use of inexpensive equipment in preparing the holographic optical element in accordance with my invention, and also in reading out the recorded data during a scanning operation.

An important object further resides in the provision of a holographic optical element of the envisaged type having the inherent capability that permits a different wavelength to be used during a readout function in contradistinction to the wavelength used in the making or constructing of the element. This wavelength shift is often necessary since, for instance, high diffraction efficiency films that are infrared sensitive have not been found. Stated somewhat differently, an aim of the invention is to use two plane waves for recording which will compensate for the wavelength shift during the readout operation in order to achieve both the desired diffraction angle and at the same time obey the Bragg condition for high diffraction efficiency. Consequently, when utilizing a hologram that has been constructed with prior art volume hologram techniques with spherical waves, it could be produced so that it would have diffracted waves at the proper angles when utilizing infrared energy, but then the hologram efficiency would not be optimal under these conditions. On the other hand, if the hologram is exposed so as to have good efficiency in the infrared range, then the diffraction angles would not be correct. Exposure correction to compensate for a wavelength shift during readout which will yield both the correct diffraction angle at readout and satisfy the readout Bragg conditions, for high diffraction efficiency, can only be accomplished for holograms formed by plane waves (not by arbitrary waves). Since complex interference patterns are built up by a series of plane wave grating facets with this invention, the former shortcoming is obviated.

Briefly, my invention makes use of dichromated gelatin photographic film, actually a thick phase film, so that nearly 100% diffraction efficiency can be realized during a readout operation. By sequentially exposing simple interference patterns on a large number of small areas of the film so that a volume hologram is recorded within each of these small facets, a relatively complex interference pattern can be built up over the entire surface of the film so as to subsequently deflect the readout beam to various desired scan points or spots determined by the complex overall pattern if the hologram is used as a laser beam scanner. The invention can also be used to transform an expanded laser beam into a complex output beam via the various facets constructed in accordance with my invention. Each facet is exposed only to the specific interference pattern intended to be recorded in that facet. This is achieved by means of a mask having an appropriately sized aperture, the aperture corresponding basically to a fraction of the cross section of the coherent light wave that impinges upon the photographic film. In other words, each facet of a holographic element constructed in accordance with my invention will contain a regular grating or zone plate having a spatial frequency such that the readout beam will be deflected in a desired direction or over the proper path during a readout operation. It is also contemplated that pulsed exposure be utilized so that between pulses, the film can be shifted behind the mask so as to expose another facet and so on until all of the desired facets have been subjected to the simple interference pattern that is to be recorded therein and which pattern or grating is but a segment of an overall complex pattern. The term "pulsed exposure" is used quite broadly and can be implemented with a mechanical or electro-optic shutter in the beam path. Where a holographic film of reasonable size can be subdivided into only a relatively small number of facets, the scan capacity thereof can be increased appreciably by resort to two or more holograms in series, each succeeding hologram accepting input light from the previous stage and diffracting it once more.

BRIEF DESCRIPTION OF THE DRAWINGS

FIG. 1 is a diagrammatic perspective view depicting a prior art system utilizing a holographic plane wave grating for producing a circular scan;

FIG. 2 is a diagrammatic perspective view depicting the use of a prior art holographic zone plate for producing a line scan;

FIG. 3 is still another prior art arrangement, this being a perspective view making use of a computer-generated hologram, also a prior art technique;

FIG. 4 is a front elevational view of a thick (volume) hologram film divided into a number of small areas forming an equal number of facets, three of the facets having interference gratings recorded therein in accordance with the procedure depicted in FIGS. 6-8;

FIG. 5 is another front elevational view of a hologram divided into horizontal and vertical rows of areas, the top three rows of areas and four of the areas in the fourth row having gratings recorded therein to form volume hologram facets;

FIG. 6 is a top plan view utilizing the film of FIG. 5 and illustrating how a holographic optical element is constructed when practicing my invention;

FIG. 7 is an enlarged fragmentary portion of FIG. 6;

FIG. 8 is a diagrammatic front view of exemplary equipment used in shifting the film to produce the element of FIG. 5;

FIG. 9 is a view corresponding generally to FIG. 6 but showing how a target can be used in order to determine the proper object beam angle relative to a reference beam;

FIG. 10 represents another arrangement for determining the beam alignment;

FIG. 11 is a perspective view in diagrammatic form illustrating the manner in which a scan readout is obtained with a holographic optical element that has been completed from the partially-completed hologram of FIG. 4;

FIG. 12 is an enlarged top plan view corresponding generally to FIG. 11;

FIG. 13 is a perspective view generally similar to FIG. 11 but showing two holographic optical elements tandemly oriented with respect to each other for the purpose of increasing the scan capacity;

FIG. 14 is a perspective view showing the use of an expanded readout beam for illuminating the hologram of FIG. 5, and FIG. 15 is a graphical representation showing diffraction efficiency plotted against exposure for a specific holographic optical element.

DESCRIPTION OF THE PREFERRED EMBODIMENT

Before describing those figures which are expressly concerned with the practicing of my invention, it is believed helpful to refer first to FIGS. 1, 2 and 3, these figures representing prior art schemes. They have been hereinbefore referred to in a general manner when discussing the prior art.

Holographic scanners use diffraction from a moving grating to deflect a spatially coherent beam of laser light. In FIG. 1 an early implementation of this principle has been embodied in the holographic scanner there shown which has been denoted generally by the reference numeral 10. A coherent beam of light is provided by a laser 12 which beam is directed through a rotatable disc element 14 having a conventional grating 16 thereon, the disc 14 rotating about a central axis as indicated by the arrow 18. The diffraction grating 16 was recorded by interfering two plane waves. After passing through the optical element 14, the diffracted pattern is directed through a lens 20 onto a scan plane 22 (which may constitute a document, film plate, sheet of metal, etc.), the resulting circular pattern 24 appearing in phantom outline. The circular path and the direction in which the scan spot moves in producing the circular pattern 24 are denoted by the two directional arrows 26.

In FIG. 2, the scanner 30, instead of using the rotating disc 14 and grating 16, employs a zone plate 32 which constitutes the optical element, its interference pattern 34 being constructed by interfering a plane wave and a spherical wave. The coherent beam from the laser 12 passes through the zone plate 32 and, when this optical element 32 is translated or moved horizontally in either direction as indicated by the double-headed arrow 36, a focused straight line scan beam moves in the direction of the arrows 37 on the scan plane 22. An additional defocused scan beam, which is undesirable, moves in the direction of the arrows 38. The undeflected beam 39, which is also undesired, is transmitted directly through the hologram 32.

Both the arrangements of FIGS. 1 and 2 make use of holograms or optical elements 14 and 32 that are relatively easy to construct. All that need be done in recording either of the gratings 16 and 34 is to expose the entire surface of the hologram film at one time. The real difficulty stems from the fact that the scan paths derivable with this construction technique are limited to circular (FIG. 1) and line (FIG. 2) scans inasmuch as the only optical waves that can be produced by reasonable and practical means are plane waves (FIG. 1) and spherical waves (FIG. 2), these waves being used to singularly expose the original photographic films to the complete pattern in each instance in producing the elements 14 and 32.

As a preface to discussing FIG. 3, it can be pointed out that more complicated scan paths require that a more complicated interference pattern be recorded, involving possibly, but not practically, a mixing of a large number of planar and spherical waves. The interferometric production of such a pattern over the entire surface of a hologram film at one time, such as done in making the holograms 14, 32 of FIGS. 1 and 2, would be an extremely difficult task. Thus, computer-generated holograms are resorted to for arbitrary scan paths, one such hologram 40 appearing in FIG. 3 containing thereon a computer-generated fringe pattern 42. In producing the holographic element 40 of FIG. 3, one intially specifies or programs a computer so as to encode data that will produce a hologram that will deflect the incident laser beam in the desired direction during a readout operation. By gradually changing the fringe pattern 42 across the computer-generated hologram 40, such a hologram will properly deflect the laser beam through whatever arbitrary path is desired as the hologram is translated through the laser beam.

In this regard, the scanner 44 of FIG. 3, in addition to the computer-generated hologram 40 having the appropriate grating 42 recorded thereon, includes a lens 46 which focuses the beam from the laser 12 after passing through the hologram 40 onto the scan plane 22 so as to trace the scan path labeled 48. To do this, all that need be done once the appropriate fringe pattern 42 is recorded on the hologram 40 is to move the hologram 40 laterally as indicated by the arrow 50. Owing to the recorded fringe pattern 42 on the element 40, the scan spot 47 traverses the irregular path that has been labeled 48 on the scan plane 22 of FIG. 3, the arrow 49 showing the movement of the spot 47 in accordance with the movement of the element 40 as indicated by the arrow 50. Stated somewhat differently, by gradually changing the fringe pattern 42 across the computer-generated hologram 40, a hologram of this character will deflect a laser beam through virtually any arbitrary path that is desired when the hologram 40 is pulled through the laser beam.

Whereas any computer-generated hologram eliminates the need for a physical object in the making of the hologram, nonetheless the process of synthesizing such a hologram can be quite costly, especially where the resulting scan path is quite complex. Obviously, the calculation of the interference between a coherent object wave and a reference wave must first be computed, and because of computer limitations associated with the average size computer, only a finite number of sampling points become practical. Also, a distinct disadvantage arises from the need for photoreduction after the artwork has been obtained from the computer which artwork simulates on a relatively large scale the interference fringes that would be caused by the actual interaction of an object wave and a reference wave; actual interference fringes are, of course, not involved. The artwork, as just pointed out, is of relatively large scale and must be photoreduced to provide the ultimate hologram capable of deflecting the beam along the appropriate or proper path. Not only is the cost of computing the interference pattern significant but fabrication of the hologram itself is appreciable. Furthermore, less than half of the incident light energy striking the hologram is diffracted into a desired order; consequently, the light efficiency is low. Even though a high degree of flexibility can be realized when resorting to a computer-generated hologram, the various shortcomings seriously deter its adoption for general applications.

In FIG. 4, it will be perceived that a light-sensitive medium in the form of photographic film has been given the reference numeral 52a. As the description progresses, it will be recognized that this film 52a, when exposed and developed in accordance with the teachings of my invention, becomes a holographic optical element which will be labeled 52 (FIG. 11), the suffix "a" being dropped in order to distinguish the finished product from that intially employed. At the moment, though, it can be mentioned that in practice a dichromated gelatin layer prepared from Kodak 649-F plates has been found to be well suited as the photographic film for making volume holographic optical elements utilizing the procedures hereinafter described. At this time, though, it should be understood that a volume hologram is one in which the photosensitive layer, that is, the dichromated gelatin layer in this instance, is thick compared to the wavelength of light. In other words, the photosensitive layer should be at least five wavelengths in thickness. Of course, the interference pattern recorded in the film 52a must have a period that is small (less that one-fifth) in relation to the thickness of the photosensitive layer.

In FIG. 4, a number of individual small areas have been delineated and, because of the thickness of the gelatin, provide a corresponding number of volume facets 54a arranged in a horizontal row. At this stage, a "facet" can be defined as that part of the scan hologram 52 (FIG. 11) which produces one resolution point on the scan path. Stated more specifically, each completed facet 54, in contradistinction to a blank or unexposed facet 54a, when constructed in accordance with my invention contains a regular grating (or possibly zone plate) 56 with a spatial frequency such that the readout beam is deflected to the desired scan point determined by the particular grating that has been recorded therein. Three completed or constructed facets 54 appear at the left in FIG. 4, however, and nine blank or unexposed facets 54a to the right in this figure. The hologram 52 in FIG. 11 has all of its facets 54 completed, as will later be made manifest. It will be recognized that the gratings 56 differ from facet to facet and that the lines constituting any given grating 56 are only a small fraction of a millimeter apart—there being perhaps 1000-2000 fringes per millimeter. Therefore, it is not possible to depict the gratings 56 accurately in the drawings, and it will be appreciated that no attempt has been made to do so. Also the change in orientation of the fringes from facet to facet has been exaggerated. It is also impractical to try to illustrate the number of areas. It is important to appreciate that the overall pattern is determined by the resulting interference pattern provided by the various individual gratings 56 that provide various fringe patterns constituting or making up the complete pattern.

To achieve the desired scan pattern, the object beam or object wavefront during the fabrication or construction of the holographic optical element 52 must be angularly adjusted so as to produce a wave propagating in the desired final output direction provided the readout wavelength is the same as the construction wavelength.

More specifically, a laser denoted by the reference numeral 58 in FIG. 6 produces the initial coherent beam 60 which is passed through a shutter 62 onto a beam splitter 64, a portion 60a of the beam 60 then being reflected angularly to a first optical device 66a and another portion 60b of the beam 60 after passing through the beam splitter 64 being reflected angularly to a second optical device 66b by a mirror 68. The devices 66a and 66b are identical, each comprising a short focal length lens 69, a pinhole plate 70 and a collimating lens 72.

The function of the two devices 66a, 66b is to expand the divided or split laser beams 60a and 60b into plane wave beams 74a and 76, respectively, having a larger cross section. The diameter of the original beam 60 is on the order of two millimeters, whereas the diameter of the beams 74a and 76 is on the order of 20 millimeters. The beam 74a is reflected by a pivotable mirror 78 through selected angles determined by the particular related position of the mirror 78 to provide the object beam 74.

It must be borne in mind that in achieving a desired interference pattern, the object beam 74 must be angularly adjusted to produce a plane wave propagating in the proper direction for the construction of the specific interference pattern or grating 56 for the particular facet 54 being constructed. More will be said hereinafter concerning the way in which the object beam 74 is angled by rotating the mirror 78 into the proper position. It should be noted at this time, though, that the mirror angle is determined by a conventional rotary position controller 80, such as Model PC 312R manufactured by Daedal, Inc., Harrison City, Pa. 15636. The controller 80 provides a pivot by reason of which the mirror can be tilted into preferred angles either via micrometers or digitally-controlled rotation stages. The double-headed arrow 82 applied to FIG. 7 will suffice to demonstrate that the object beam can be swung horizontally into different angles; the beam can also be swung vertically and/or horizontally.

Whereas the object beam 74 is approximately normal to the film 52a, its exact angle of incidence being variable as mentioned above, the reference beam 76 coacts with the object beam 74 to produce the desired interference pattern or grating 56 for each facet 54. The reference beam 76 impinges on the particular facet 54 at a fixed angle of approximately 30 degrees with respect to a plane normal to the film 52a. As explained below, each facet 54a is exposed at a given time to the two coherent wavefronts provided by the beams 74 and 76.

To assure that only a single area 54a will be exposed at any given time when recording a grating 54 in the construction of a facet 54, a curved flexible mask 84 is utilized having a slit or aperture 86 therein which only allows the object beam 74 and the reference beam 76 to strike the single area 54a that is to constitute a given facet 54 to record therein the grating 56. In this way, each facet 54 is formed by the incident light provided by the object beam 74 and by the reference beam 76. Actually, the areas 54a are sequentially or successively exposed by physically shifting the film 52a relative to the mask 84, thereby aligning the aperture 86 with whatever area 54a that is then to be exposed. It will be appreciated that this procedure will effect the recording of the appropriate grating 56 in each facet 54 that will coact with the gratings 56 of other facets 54 to produce the required spot scan path when a readout operation is later conducted.

While the specific manner of translating the holographic film 52a is not critical to a practicing of my invention, perhaps the hologram film 152a of FIG. 5 should be referred to, this film providing the holographic optical element 152 of FIG. 14. In this instance, the film 152a is composed of numerous small areas 154a arranged in horizontal and vertical rows. The volume facets derived by exposing the areas 154a to interfering light to form the gratings 156 have been indicated by the reference numeral 154. Twenty-five facets 154, each having a grating 156 have been constructed in FIG. 5.

A suitable means 88 has been illustrated in FIG. 8 for translating the films 52a and 152a in an X or horizontal direction as indicated by the arrow 90 (and also in a Y or vertical direction as indicated by the arrow 92). Equipment of the referred to character can be purchased from Daedal, Inc., their Model 2800 being suitable. Digital-controlled apparatus is deemed superior. At any rate, the means 88 exemplified in FIG. 8 comprises a horizontal base 94 having a slide plate 96 mounted thereon, the slide plate 96 being shifted horizontally by a stepping motor 98. The plate 96 carries an upstanding support 100 having a second slide plate 102 mounted thereon, the slide plate 102 being shifted vertically by another stepping motor 104. A film holder 106 is fixedly carried in the slide plate 102. An appropriately programmed position controller 108 contains the necessary electronics to assure the appropriate energization of the stepping motors 98 and 104 to move the holder 106 horizontally in the direction of the arrow 90 and vertically in the direction of the arrow 92. Since the film 152a requires translation in both the X and Y directions, it has been shown as being mounted in the holder 106. Each facet 54 or 154 is exposed with coherent light to produce the necessary grating 56 or 156, the holder 106 being incrementally shifted with the film 52a or 152a thereon so as to sequentially register appropriate areas 54a or 154a with the aperture 86 of the mask 84.

Recapitulating somewhat, it can be emphasized that the individual facets 54 of the holographic optical element are serially or sequentially constructed by advancing the film 52a by one facet width between each exposure. More specifically, the laser beam 60 is utilized, being pulsed through the agency of the shutter 62. As already explained, the beam 60 in FIG. 6 is split into the object beam 74 and reference beam 76. The film 52a remains stationary during each individual exposure to the object and reference beams 74, 76. Once an exposure is completed, and the laser beam turned off, then the film 52a is advanced so as to present to view the next facet. The thin flexible mask 84 which is stationary is pressed lightly against the film 52a. Owing to the specific size of the aperture 86 in the mask 84, only one facet 54 is constructed at a time.

Virtually the same procedure is utilized in making the raster-like holographic optical element 152. The only difference is that the element involves a number of horizontal rows of facets, which are also arranged in vertical rows. Therefore, the apparatus 88 first incrementally shifts the film 152a horizontally for the top row, followed by a vertical shift to the second row down, and so on for each horizontal row.

In constructing the hologram or holographic optical element 52, as well as the element 152, in accordance with the teachings of my invention, it is important to have the object wave or beam 74 as well as the reference wave or beam 76, directed onto the particular area 54a in the proper angular relationship. As already mentioned, the reference beam 76 is directed onto each area 54a at 30° with respect to the film normal 52a, that is, at 60° relative to the plane of the film 52a; this angle need not be precisely determined, but should be greater than or equal to approximately 30° for the exposure wavelength (0.488 micrometer) and holographic film thickness (16 micrometers) used in these experiments to ensure 100% diffraction efficiency. Once selected, the reference angle should remain fixed inasmuch as the same angle will be used for the readout beam later on. It is the angle of the object beam 74 that requires varying in order to produce the desired pattern of the grating 56 (and, of course, the various gratings 156 of the hologram 152). In other words, the object beam 74 must produce a plane wave or possibly a spherical wave propagating in the desired direction.

It is the function of the mirror 78 to direct the object beam 74 properly. Although the angle of the mirror 78 can be calculated and the mirror 78 adjusted via the rotary position controller 80, this open loop technique is not sufficiently accurate in many instances when the film substrate contains slight irregularities which will cause additional deflection of the beam. Therefore, the invention contemplates that part of the object wave or beam 74 be passed through the photographic film 52a just above the area 54a at which a facet 54 is to be constructed. The portion passing through the film 52a is focused onto a target containing an image of the desired scan pattern. The object wave mirror 78 is then adjusted through the agency of the controller 80 so as to direct the object wave or beam 74 to the proper position on the target.

Owing to the simplicity of the above-described method of steering the beam 74, such method has not been actually illustrated but has been demonstrated. For even better results, the system 109 appearing in FIG. 9 can be utilized. Assuming that a film 52a having virtually no red sensitivity is used, the mask 84 having the aperture 86 therein is juxtaposed with respect to the film 52a. A relatively weak expanded beam 110 derived from a HeNe laser 112 is employed, the beam 110 being directed onto a beam splitter 114 which has 95% transmittance and in this case acts as a beam combiner. The HeNe laser beam 110 is reflected from the splitter 114 onto the object beam steering mirror 78 from which the beam 110 is reflected through the aperture 86 in the mask 84, through the film 52a, through a lens 116 and onto an alignment target 118 which has the desired scan path thereon.

It is planned that an argon laser emitting blue or green light to which the film is sensitive, such as the laser 58 in FIG. 6, be utilized for the actual exposure of the facets 54 in FIG. 9. The shutter 62, although omitted from FIG. 9 blocks the beam 60 during the alignment procedure that has just been described; therefore, the object beam 74 is literally shuttered off at this time. Once aligned, then the shutter 62 is opened so as to cause the object wave or beam 74 to impinge on the film 52a through the aperture 86 so as to record the desired grating 56 onto the particular facet 54 being constructed.

Stated somewhat differently, the mirror 78 is angularly positioned by using the weak reference beam 110. Once correctly adjusted, the mirror 78 remains in its adjusted position during the actual exposure with the object beam 74. Because of the beam splitter 114 the HeNe laser beam 110 and argon laser beam 74a are coaxial after the beam splitter so that when the HeNe beam is correctly steered, the argon beam will also be properly adjusted. The reference beam 76, used of course during the actual recording step, has been omitted in order to keep FIG. 9 uncluttered.

The system 109 of FIG. 9 requires that the film 52a be insensitive to the wavelength of the alignment beam 110. The system 120 of FIG. 10 avoids the sensitivity problem. The exposure or object beam is derived in the same manner as already described, as is the reference beam 76 (not shown in FIG. 10 for reasons of keeping the figure simple). What is different in FIG. 10 is the use of an alignment laser 122 that provides a laser beam 124a of whatever color the laser 122 is designed to provide. The beam 124a, which does not require expansion, is directed toward the mirror 78 and is reflected as an alignment beam 124 onto a target 126. In this situation the target 126 contains an image such that, when the mirror 78 is properly adjusted via the controller 80 and when the beam 74 is "turned on" by opening the shutter 62 (see FIG. 6), the beam 74 will impinge on the film 52a at the proper angle for the specific grating 56 to be recorded in the facet 54 being constructed.

It is often desirable to have holographic optical elements that work well in the infrared frequency range. Unfortunately, holograms that possess a high diffraction efficiency and are sensitive to infrared recording do not exist at the moment. Thus, if one wishes to use a holographic approach, one must record at one wavelength, where the film is sensitive but record such that the infrared beam will have the proper readout. In general, certain things must be done in the hologram: (1) the spacing and the tilt of the interference fringes within the volume of the hologram or holographic optical element must be such that the infrared beam is deflected through the proper angle and incident at the Bragg angle for the hologram, and (2) the index modulation within the volume of the film material must also be sufficiently great to produce 100% diffraction efficiency in the infrared range. From FIG. 15 one notes the high diffraction efficiency possible with dichromated gelatin film. 100% diffraction efficiency is also possible at the output wavelength of a NdYAG laser (1.06 micrometer).

However, a multi-faceted holographic optical element 52 or 152 as herein disclosed is extremely useful when a different wavelength is to be used for readout in contradistinction to that employed for construction. This is because the output diffraction angle and the diffraction efficiency from a volume hologram are coupled or correlated such that if one were to expose a large hologram, such as the hologram 32 in FIG. 2 so that it would produce diffracted waves at the proper angles in the infrared portion of the spectrum, the hologram efficiency would not be optimal. If, on the other hand, the hologram 32 were exposed to have good efficiency in the infrared range, the diffraction angles would not be correct. This will always be the case for holograms constructed with non-planar waves. Only for gratings constructed with two plane waves can compensation be made for the wavelength shift during a readout operation in order to achieve both the desired diffraction angle and also to obey the Bragg condition for high diffraction efficiency. By constructing a hologram 52 or 152 with numerous, tiny, plane-wave gratings 56 or 156, as is done when employing the present invention, both diffraction efficiency and the proper diffraction angle can be optimized for the entire width of the hologram.

FIG. 11 rather diagrammatically depicts the manner in which a readout is achieved as far as the holographic optical element 52 is concerned. The readout system has been given the reference numeral 128. It will be assumed that the hologram 52 is placed in the holder 106 (see FIG. 8) and the stepping motor 98 incrementally energized to move or translate the element in the direction of the arrow 130. The holographic optical element 52 is positioned so as to bring each facet 54 into registry with the readout beam 132, which must be at the same angle as the reference beam 76 used during the recording procedure. Only the reference beam 132 is utilized during the readout, which beam is provided by the laser 134. The reference or readout beam 132 is directed onto each facet 54 and the beam 132 is in this way successively deflected in accordance with the grating 56 configuration for each particular facet 54. In FIG. 11, the resulting beam 132a passes through a lens 135 onto the scan plane 22. In other words, by moving the hologram or holographic optical element 52 in the direction of the arrow 130, the beam 132a is caused to traverse a scan path determined by the composite interference pattern provided by the various indiviual gratings 56 recorded in the various facets 54. The scan spot, labeled 136, moves to the right to produce the scan path 138. FIG. 12 shows a portion of the system 128 of FIG. 11 on a larger scale.

It is recognized that physical or size limitations result so that for a given size photographic film 52a, the number of facets 54 must be limited; otherwise, the illuminating light will overlap a given facet, possibly causing aberrations of the scan 136. In other words, the beam 132 that is used during readout might very well overlap onto neighboring facets 54. While the number of facets 54 cannot be increased above a certain density per film of a given size, it is practical to employ two holograms or holographic optical elements 52 and 252 in tandem or series, each having a given number of facets 54 thereon. Such an arrangement is pictured in FIG. 13, the system having been denoted generally by the reference numeral 228 in that it corresponds basically to the system 128 of FIGS. 11 and 12. It is understood that the holograms can be moved independently so that a large number of combinations of individual facets on the two holograms can be addressed to produce a correspondingly large number of different deflected beams 139. It should also be understood, though, that the facets 54 belonging to the first holographic optical element 52 provide one strong or outstanding diffracted order and the facets 54 of the second element 252 also provide one strong diffracted order and produce no disturbing additional orders. Of course, more than two holograms or elements, such a those labeled 52 and 252 in FIG. 13, can be serially employed.

The particular facets 54 being illuminated in FIG. 13 transfer all of the incident energy so that no drastic energy losses occur as a result of each diffraction by the facets 54 of the first or the second element 252 (or any subsequent holograms). This high efficiency is possible as long as the Bragg conditions are satisfied for both holograms in FIG. 13. Since the incidence angle of the readout beam 137 may arrive at facet 54 of hologram 252 at variable angles as a result of deflection by different possible facets of hologram 52, we must ensure that beam 137 still satisfies the Bragg conditions for hologram 252. We can ensure this by taking advantage of the fact that, for transmission holograms, Bragg angle requirements are more stringent in one incidence direction than in the orthogonal direction. Thus, for instance, if the various facets of the first hologram 52 deflect the beam 132 at various vertical angles in addition to the constant horizontal deflection of approximately 30° as described earlier, the second hologram 252 can be constructed to have nearly vertically oriented fringes so that it has little sensitivity to vertical deviations from the exact Bragg conditions. Thus, high diffraction efficiency from the second hologram is also ensured independent of the deflection produced by the first hologram 52.

The scan beam 132 in FIG. 13 is constrained to a particular cross section that is no larger than the width of the facets 54 for the first hologram 52 and the resulting scan beam impinging on the second hologram 252 is no larger than any of the facets 54 constituting the second hologram 252.

Consequently, even though a relatively small number of facets 54 can be placed on a reasonably sized hologram intended for scanning purposes, the scan capacity can be increased by adding additional holograms in a tandem relationship. Thus, the size of the facets 54 is not decreased and the facets may, for instance, have a size equal to that of a laser beam diameter for simplicity and to eliminate the need for additional lenses to expand or contract the laser beam. Consequently, in performing a readout operation no illumination spills over from the intended facet 54 at which the beam is directed onto a neighboring facet, for this could create an undesirable aberration condition. The present invention, when resorting to the above-described tandem arrangement depicted in FIG. 13, permits avoidance of this condition.

It will be appreciated that my invention lends itself to transforming an entire wavefront. To do this an expanded readout beam 140 is employed, as can be noted from FIG. 14. The expanded readout beam 140 is produced with an optical device, such as either the device 66a or 66b of FIG. 6. The expanded beam 140 illuminates the entire holographic optical element 152 in FIG. 14 to produce whatever overall output pattern has been recorded in the individual facets 154 by reason of the various gratings 156. For the sake of illustration, the letter "Z", which has been identified by the reference numeral 142, constitutes the arbitrarily specified pattern in the illustrative instance.

When completed, the entire surfaces of the holographic elements 52 and 152 would usually be covered by cementing a protective transparent plate, such as glass, on each element 52, 152 with an optical cement.

I claim:

1. A holographic system comprising a holographic optical element formed with a plurality of relatively small rectangular facets, the edges of adjacent facets being contiguous with each other and each facet containing a desired grating pattern therein representative of a portion of a complete and more complex pattern, the grating pattern of each facet extending to the edge thereof and hence to the edge of the next adjacent facet so that the plurality of relatively small facets, in combination, form a relatively complex interference pattern representative of said complete and more complex pattern of which each grating pattern is but a portion, and means for illuminating the facets of said optical element to derive a complete and more complex image directly from said complete and more complex pattern containing information representatively embodied in said relatively complex interference pattern.

2. A holographic system in accordance with claim 1 in which each facet is of uniform width in the range of 1.5 millimeters to 2.5 millimeters and said illumination step is performed with an expanded readout beam.

3. A holographic optical element comprising a plurality of individually constructed rectangular facets having substantially parallel edges with the adjacent parallel edges of adjacent facets coinciding with each other, each facet including a grating pattern so that an expanded readout beam will be appropriately diffracted to produce a relatively complex image, the gratings of adjacent facets differing from each other to form differing relatively simple images that, in combination, produce said relatively complex image.

4. A holographic optical element in accordance with claim 3 in which each facet is individually constructed by the interference of only planar waves or only spherical waves to provide said grating patterns.

5. A holographic optical element in accordance with claim 3 in which said grating in each facet is formed from two coherent beams, one being a reference beam and the other being an object beam at a selected angle of incidence with respect to the facet to provide the grating pattern for that particular facet.

6. A holographic method comprising the steps of forming a first desired grating pattern in a first rectangular facet of a light-sensitive medium, said first facet having a predetermined width defined by spaced parallel edges, then forming a second desired grating pattern in a second rectangular facet of said light-sensitive medium, said second facet having the same predetermined width defined by spaced parallel edges, the adjacent edges of said first and second facets coinciding with each other, then successively forming additional desired grating patterns in additional facets, the combination of said various grating patterns forming a combined relatively complex interference pattern, and subsequently subjecting said facets to an expanded readout beam to provide an image derived from said relatively complex interference pattern.

7. A method of using a holographic optical element composed of a number of adjacent rectangular facets, each adjacent facet containing an individual and different grating pattern recorded therein, the method comprising the steps of providing an expanded coherent readout beam, and causing said expanded readout beam to simultaneously impinge on said facets.

8. A method in accordance with claim 7 including a second holographic optical element composed of a number of second facets, each of said second facets having a given grating pattern recorded therein, the method comprising the step of placing said second element in a tandem relation with said first element.

9. A method in accordance with claim 8 in which the grating pattern contained in the facets of said first element produce a deflection of said beam in an X-Y direction and the grating pattern contained in the facets of said second element produce a second deflection of said beam.

10. A method of making a holographic element comprising the steps of providing a holographic film, providing a coherent object beam, passing a portion of the object beam through said film at a location adjacent a first surface area of said film prior to exposing said first surface area, said portion of the object beam constituting an alignment beam, focusing said alignment beam onto a target containing an image of a desired scan pattern in order to enable the direction of said object beam to be adjusted, confronting said film with a mask having an aperture therein to provide said first surface area adjacent to the location where said portion of the object beam constituting said alignment beam passes through said film, simultaneously illuminating said mask with said coherent object beam and a coherent reference beam so that the light from both of said beams passes through only said aperture onto said first surface area of the film to expose said first surface area and to form a first facet when said film is developed, relatively moving said mask and film so that said aperture is in a position to pass light from said beams onto a second surface area of said film adjacent to said first surface area to expose said second surface area that is to form a second facet when said film is developed, the width of said surface areas being determined by the width of said aperture.

11. A method in accordance with claim 10 including the step of adjusting the direction of the object beam so as to properly position said alignment beam on said target for each of said facets prior to exposing each of said facets to said coherent object beam and said coherent reference beam.

12. A method of making a holographic optical element comprising the steps of providing a holographic film, providing a coherent object beam, directing an alignment beam onto a target adjacent a first surface area of the film that is to form a first facet when said film is developed in order to enable adjustment of the angular position of said object beam, confronting said film with a mask having an aperture therein, simultaneously illuminating said mask with said coherent object beam and a coherent reference beam so that the light from said beams passes only through said aperture onto said first surface area of said film to form said first facet when said film is developed, moving said mask and film so that said aperture is in a position to pass light from said beams onto a second surface area of said film adjacent to said first surface area to form a second facet when said film is developed, the width of said surface areas being determined by the width of said aperture.

13. A method in accordance with claim 12 in which said alignment beam is directed onto an angularly positionable mirror and reflected onto said target, said object beam then being reflected from said mirror onto said first surface area of the film.

14. A method in accordance with claim 12 in which said alignment beam is directed onto an angularly positionable mirror and then onto said target to adjust the angular position of said object beam before each facet is formed.

15. A method in accordance with claim 14 in which said target is angularly spaced from said film, and said alignment beam is directed onto said mirror at an angle so as to strike said target without striking said film.

16. A holographic system including a first holographic optical element comprising a plurality of individually constructed rectangular facets having substantially parallel edges with the adjacent parallel edges of adjacent facets coinciding with each other, each facet including a grating forming a relatively simple interference pattern so that a readout beam will be appropriately diffracted to produce a relatively complex image, the gratings of adjacent facets differing from each other to form differing relatively simple images that, in combination, produce said relatively complex image and in which case each of said facets produce a diffracted output beam in accordance with said relatively complex pattern, a second holographic optical element comprising a second plurality of individually constructed facets, each of said second plurality of facets also having a relatively simple interference pattern and the second plurality of facets providing additional diffraction at different angles for said output beam when said second holographic optical element is used with said first holographic optical element.

* * * * *